United States Patent
Bert

(10) Patent No.: US 12,111,761 B2
(45) Date of Patent: Oct. 8, 2024

(54) MEMORY CACHE MANAGEMENT BASED ON STORAGE CAPACITY FOR PARALLEL INDEPENDENT THREADS

(71) Applicant: MICRON TECHNOLOGY, INC., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/688,506

(22) Filed: Mar. 7, 2022

(65) Prior Publication Data
US 2022/0188231 A1 Jun. 16, 2022

Related U.S. Application Data

(63) Continuation of application No. 16/922,959, filed on Jul. 7, 2020, now Pat. No. 11,275,687.

(51) Int. Cl.
*G06F 12/0808* (2016.01)
*G06F 12/0871* (2016.01)

(52) U.S. Cl.
CPC ...... *G06F 12/0808* (2013.01); *G06F 12/0871* (2013.01); *G06F 2212/50* (2013.01)

(58) Field of Classification Search
CPC ............ G06F 12/0808; G06F 12/0871; G06F 2212/50; G06F 3/0649; G06F 2212/7201
See application file for complete search history.

(56) References Cited

U.S. PATENT DOCUMENTS

| | | | | |
|---|---|---|---|---|
| 5,860,082 A | * | 1/1999 | Smith | G06F 12/0246 711/202 |
| 7,039,788 B1 | * | 5/2006 | Chang | G06F 12/0246 711/155 |
| 8,886,877 B1 | * | 11/2014 | Avila | G06F 12/0246 711/E12.008 |
| 9,405,675 B1 | * | 8/2016 | Kang | G06F 12/0246 |
| 11,138,071 B1 | * | 10/2021 | Agarwal | G06F 3/061 |

(Continued)

FOREIGN PATENT DOCUMENTS

| | | |
|---|---|---|
| CN | 102804152 A | 11/2012 |
| CN | 108806754 A | 11/2018 |

(Continued)

OTHER PUBLICATIONS

Chinese Search Report of Chinese Application No. 202110761619.4 dated Jan. 9, 2023, 4 pages.

(Continued)

*Primary Examiner* — Chie Yew
(74) *Attorney, Agent, or Firm* — Lowenstein Sandler LLP

(57) ABSTRACT

A first data item is programmed to a first memory page of a first block included in a cache that resides in a first portion of a memory device. The first data item is associated with a first processing thread. A second memory page including a second data item associated with the first processing thread is identified. The second memory page is contained by a second block of the cache. The first data item and the second data item are copied to a second portion of the memory device. The first memory page and each of the one or more second memory pages are designated as invalid.

17 Claims, 9 Drawing Sheets

(56) References Cited

U.S. PATENT DOCUMENTS

| | | | |
|---|---|---|---|
| 2007/0118688 A1* | 5/2007 | Lee | G06F 12/0868 |
| | | | 711/E12.019 |
| 2009/0222618 A1 | 9/2009 | Cho | |
| 2010/0191897 A1* | 7/2010 | Zhang | G06F 12/0246 |
| | | | 711/170 |
| 2014/0115241 A1* | 4/2014 | Wei | G06F 12/0246 |
| | | | 711/103 |
| 2015/0254015 A1 | 9/2015 | Seo et al. | |
| 2017/0160940 A1* | 6/2017 | Yang | G06F 3/0652 |
| 2018/0300240 A1 | 10/2018 | Li et al. | |
| 2018/0314444 A1 | 11/2018 | Jinzenji | |
| 2018/0367518 A1* | 12/2018 | Singh | H04L 63/06 |
| 2019/0278491 A1 | 9/2019 | Rayaprolu et al. | |
| 2019/0294358 A1* | 9/2019 | Suzuki | G06F 3/064 |

FOREIGN PATENT DOCUMENTS

| | | |
|---|---|---|
| CN | 111124267 A | 5/2020 |
| CN | 111352866 A | 6/2020 |

OTHER PUBLICATIONS

Chinese Search Report of Chinese Application No. 202110761619.4 dated Jun. 16, 2022, 6 pages.

* cited by examiner

MEMORY CACHE MANAGEMENT BASED ON STORAGE CAPACITY FOR PARALLEL INDEPENDENT THREADS

RELATED APPLICATIONS

This application is a continuation application of co-pending U.S. patent application Ser. No. 16/922,959, filed Jul. 7, 2020, the entire contents of which is incorporated by reference herein.

TECHNICAL FIELD

Embodiments of the disclosure relate generally to memory sub-systems, and more specifically, relate to low-bit density memory caching of parallel independent threads.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
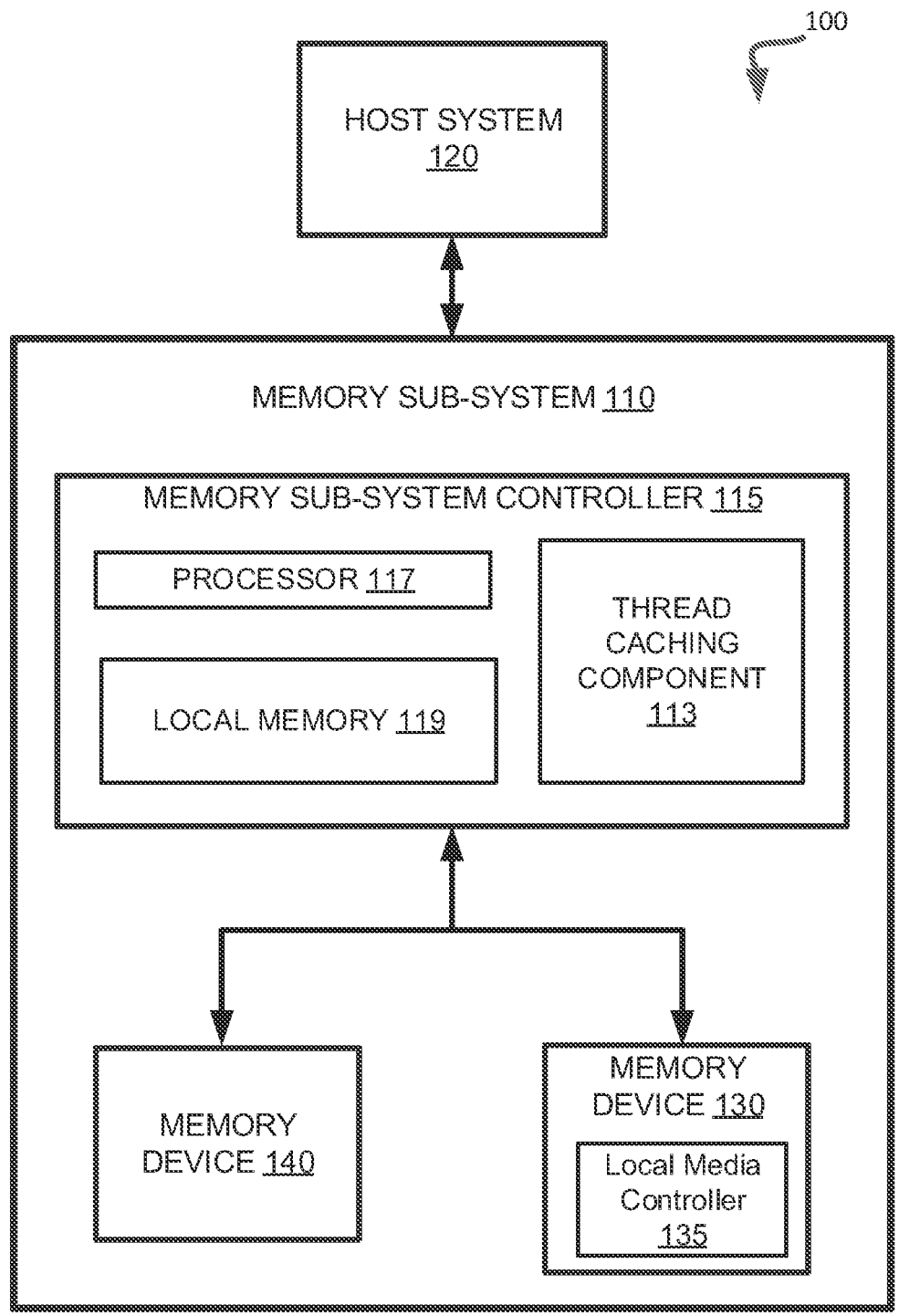
FIG. 1 illustrates an example computing system that includes a memory sub-system, in accordance with some embodiments of the present disclosure.

Aspects of the present disclosure are directed to low-bit density memory caching memory pages of parallel independent threads. A memory sub-system can be a storage device (e.g., solid-state drive (SSD)), a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory devices can include volatile and non-volatile memory devices that can store data from the host system. One example of non-volatile memory devices is a negative-and (NAND) memory device. Other examples of non-volatile memory devices are described below in conjunction with FIG. 1. Each of the non-volatile memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1," or combinations of such values.

Various memory access operations can be performed on the memory cells. Data can be written to, read from, and erased from memory cells. Memory cells can be grouped into a write unit, such as a page (also hereinafter referred to as a "memory page"). For some types of memory devices, a page is the smallest write unit. A page size represents a particular number of cells of a page. For some types of memory devices (e.g., NAND), memory cells can be grouped into an erase unit, such as a physical block, which is a group of pages. A physical block is a 2-dimensional memory array of pages (rows of cells) and strings (columns of cells). Data can be written to a block, page-by-page. Data can be erased at a block level. However, portions of a block cannot be erased.

Memory cells in the same erase unit (e.g., block) can be configured to store a specific number of bits of information. For example, a single level cell (SLC) block includes memory cells each configured to store a single bit of information. In other examples, memory cells can each be configured to store multiple bits of data, such as multi-level cells (MLCs), triple-level cells (TLCs), quad-level cells (QLCs), or penta-level cells (PLCs) (collectively referred to as XLCs). Each memory cell type can have a different density, which corresponds to an amount of data (e.g., bits of data) that can be stored per memory cell.

A memory sub-system controller can configure a region (e.g., memory cells in the same erase unit, such as a block) of a physical memory device (e.g., NAND) as a lower density cell type, for example, as SLC, and can operate in a respective lower density mode (e.g., SLC mode). Another region can be configured as a higher density cell type, for example, as XLC, and can operate in a respective higher density mode (e.g., XLC mode). A memory sub-system controller can access the SLC blocks and XLC blocks during operation of the memory sub-system. For example, the memory sub-system controller can write data received from a host system to a SLC block or an XLC block. Although the memory sub-system controller can access memory cells of the SLC blocks more quickly than the XLC blocks, the XLC blocks can store a significantly higher amount of data than the SLC blocks.

To improve performance, a memory sub-system can utilize a region of a memory device having lower density blocks as cache. For example, the cache can be a SLC cache. A memory device can be further configured so that a portion of the memory device is provisioned as a cache (which is not directly addressable by the host) and another portion of the memory device is provisioned as a host space (which is directly addressable by the host). In conventional memory sub-systems, the cache can include one or more low bit density (e.g., SLC) blocks and the host space can include one or more high bit density (e.g., XLC) blocks. During operation of the memory sub-system, the memory sub-system controller can receive data to be stored at the memory device. The memory sub-system controller can initially write the received data to the cache and subsequently copy the data from the cache to the host space (e.g., in response to determining the cache is full). Often in conventional memory sub-systems, the initially received data is written to the low-bit density cache in order to meet performance and endurance expectations.

In some instances, the memory sub-system controller can receive data associated with a particular host thread of execution (referred to as a thread). A "thread" refers to a sequence of executable instructions that can be performed by a processing device in a context which is separate from contexts of other threads. The memory sub-system controller can allocate a particular number of pages at a memory device to each thread. During operation of the memory sub-system, the memory sub-system controller can receive data allocated to multiple host threads. The memory sub-system controller can store the data to a memory page of the cache in the order the data is received. For example, the memory sub-system controller can receive data for a data item for to a first thread, a data item for a second thread, and another data item for the first thread.

"Data item" refers to an atomic unit of data that is written to and/or read from a memory device of the memory sub-system. For example, a "data item" may refer to a data block or to a key-value pair. A "data block" is a group of data of a given size (e.g., 4K of data, 128K of data) sent to a memory sub-system (e.g., SSD) by the host system. A data item to be written to a memory device can be produced by a particular execution thread running on the host, in which case the data item is referred to as being associated with the thread.

The memory sub-system controller can store the data items in memory pages at the cache in the order received. In response to determining data for each allocated memory page is stored at the cache, the memory sub-system can copy each memory page to the host space.

In some instances, a memory page for a particular thread can remain in the cache for a significant period of time (e.g., hours, days, weeks, etc.) before all data for the thread is written to the cache and subsequently written to the host space. Some conventional memory sub-systems allocate at least one low bit density (e.g., SLC) blocks for each thread associated with a memory device in order provide enough space to cache data for each thread until each memory page for each thread associated with the memory device is received. As a result, a significant amount of space in a memory device can be allocated for SLC caching, resulting in a fewer number of XLC blocks allocated as host space at the memory device.

In some memory sub-systems, a separate portion of the memory device can include one or more low bit density (e.g., SLC) blocks that are provisioned for data compaction (hereinafter referred to as "data compaction blocks"). In response to determining the cache is full or almost full, the memory sub-system controller can copy valid memory pages from the cache to the data compaction blocks and erase the cache.

A page of a block can contain valid data, invalid data, or no data. Invalid data is data that is marked as outdated as a new version of the data is stored on the memory device. Invalid data (also referred to as "stale data") includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to. A page that contains valid data is hereinafter referred to as a "valid memory page" or "valid page."

The memory sub-system controller can write incoming data received from the host system to available memory pages of the data compaction blocks. In response to determining a data compaction block is full or almost full, the memory sub-system controller can copy valid memory pages from the data compaction block to the cache and erase the data compaction blocks.

As described previously, a memory page for a particular thread can remain in the cache for example, for hours, days, weeks, etc. before data for each memory page allocated to the thread is received by the memory sub-system controller. Therefore, a memory page associated with the particular thread can be copied back and forth between the cache and the data compaction blocks for weeks or longer before the memory page is finally copied to the host space at the memory device of the memory sub-system. As a result of this frequent copying, a significant amount of memory sub-system resources (e.g., data bus, processing time, etc.) are consumed. The significant consumption of memory sub-system resources can cause a significant increase in overall system latency as well as a significant decrease in overall system efficiency.

Aspects of the present disclosure address the above and other deficiencies by using a tiered set of data compaction blocks to facilitate caching of memory pages during operation of a memory sub-system. Multiple blocks of a memory device can be designated for low bit density (e.g., SLC) caching. One or more low bit density (e.g., SLC) blocks can be reserved for writing data received by the memory sub-system controller (referred to as write blocks). Two or more low bit density (e.g., SLC) blocks of the memory device can be allocated as data compaction blocks. Each data compaction block can be designated to store memory pages associated with a particular modification frequency. A modification frequency refers to an estimated or actual number of modifications to be made, within a unit of time, to a particular unit of data during operation of the memory sub-system. In some embodiments, a modification can refer to a write operation and/or a copying operation performed for the particular unit of data during operation of the memory sub-system.

In some embodiments, the memory sub-system controller can receive data associated with multiple threads. The memory sub-system controller can write the received data to memory pages of a write block in the order the data is received. In response to determining that each memory page allocated to a particular thread is stored at the write block, the memory sub-system controller can copy each allocated memory page to designated host space on the memory sub-system.

In response to determining the write block is full or almost full, the memory sub-system controller can determine that a data compaction block associated with a high modification frequency is to store each memory page of the write block. The memory sub-system controller can copy each valid memory page of the write block to the high modification frequency data compaction block and erase the write block. The memory sub-system controller can continue to write received memory pages to the write block. In response to determining that each allocated memory page for a particular thread is stored at either the write block the first data compaction block, the memory sub-system controller can copy each allocated memory page from the write block or the first data compaction block to the host space and mark each copied memory page as invalid.

In response to determining that the high modification frequency data compaction block is full or almost full, the memory sub-system controller can determine that a data compaction block associated with a low modification frequency is available to store each memory page of the high modification frequency data compaction block. The memory sub-system controller can copy each valid memory page of the high modification frequency data compaction block to the low modification frequency data compaction block and erase the high modification frequency data compaction block. In response to determining each memory page allocated to a particular thread is stored at the write block, the high modification frequency data compaction block, or the low modification frequency data compaction block, the memory sub-system controller can copy each allocated memory page to the host space and mark each copied memory page on the cache as invalid.

Advantages of the present disclosure include, but are not limited to, reducing an amount of space at a memory device allocated for low bit density (e.g., SLC) caching. By using a tiered set of data compaction blocks to facilitate thread caching, a smaller amount of space at the memory device can be allocated for SLC caching as SLC blocks are not allocated in order to provide enough space to cache each memory page for each thread of a host system. Instead, a particular number of SLC blocks can be allocated as data compaction blocks to facilitate caching memory pages in accordance with a modification frequency of a memory page (i.e., high modification frequency or low modification frequency). By allocating the SLC blocks as data compaction blocks, the amount of space at the memory device allocated for caching can be significantly reduced with respect to the conventional cache implementations, thereby increasing the amount of space available as host space. As a result of increasing the amount of host space available, a memory sub-system can be usable for a higher number of applications.

Further, by using the tiered set of data compaction blocks to facilitate thread caching, the present disclosure allows for a reduction in an amount of copying operations performed between write blocks and data compaction blocks. During operation of a memory sub-system, a memory page that would otherwise be frequently copied between a cache and a data compaction block for weeks or longer before the memory page is finally copied to the host space instead is eventually copied to a low modification frequency data compaction block. The memory page can remain at the low modification frequency data compaction block until the memory sub-system controller receives all memory pages associated with a particular thread. As a result, a significant amount of memory sub-system resources (e.g., data bus, processing time, etc.) are not consumed due to frequent memory page copying, causing a decrease in overall system latency as well as an increase in overall system efficiency.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130, 140 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, multiple blocks of memory device 130, 140 can be designated for low bit density (e.g., SLC) caching. Memory sub-system controller 115 can reserve one or more low bit density (e.g., SLC) blocks for caching data received by memory sub-system controller 115 (referred to as write blocks). Memory sub-system controller 115 can further reserve two or more low bit density blocks of memory device 130, 140 for block compaction. Block compaction refers to copying one or more valid memory pages from multiple blocks of memory device 130, 140 to a particular block. Each data compaction block can be designated to store data pages associated with a particular modification frequency. A modification frequency refers to an estimated or actual number of modifications to be made, within a unit of time, to a particular unit of data during operation of the memory sub-system. Multiple high bit density (e.g., XLC) blocks of memory device 130, 140 can be designated as host space. As described previously, host space can be portions of memory device 130, 140 that are directly addressable by the host. Memory sub-system controller 115 can copy data from the cache to the host space (e.g., in response to determining the cache is full).

The memory sub-system 110 includes a thread caching component 113 that facilitates the performance of error correction operations for memory devices 130, 140 during operation of memory sub-system 110. In some embodiments, the memory sub-system controller 115 includes at least a portion of the error thread caching component 113. For example, the memory sub-system controller 115 can include a processor 117 (processing device) configured to execute instructions stored in local memory 119 for performing the operations described herein. In some embodiments, the thread caching component 113 is part of the host system 110, an application, or an operating system. In other embodiments, local media controller 135 includes at least a portion of thread caching component 113 and is configured to perform the functionality described herein.

The thread caching component 113 can facilitate caching memory pages of parallel independent threads at memory device 130, 140. A thread refers to a sequence of executable instructions that can be performed by a processing device in a context which is separate from contexts of other threads. Memory sub-system controller 115 can allocate a particular number of pages at a memory device 130, 140 for each thread (e.g., during initialization of memory sub-system 110). Thread caching component 113 can receive data associated with multiple threads and write the received data to memory pages of a write block in the order the data is received. In response to determining that each allocated memory is stored at the write block, memory sub-system controller can copy each allocated memory page to host space.

In response to determining the write block is full or almost full, thread caching component 113 can determine that a data compaction block associated with a high modification frequency is available for copying each memory page of the write block. Thread caching component 113 can copy each valid memory page of the write block to the high modification frequency data compaction block and erase the write block. Thread caching component 113 can continue to write received data to memory pages of the write block. In response to determining the high modification frequency data compaction block is full or almost full, thread caching component 113 can determine that a data compaction block associated with a low modification frequency is available to store each memory page of the high modification frequency data compaction block. Thread caching component 113 can copy each valid memory page of the high modification frequency data compaction block to the low modification frequency data compaction block and erase the first data compaction block.

In response to determining each allocated memory page for a particular thread is stored at the write block, the high modification frequency data compaction block, or the low modification frequency data compaction block, thread caching component 113 can copy each allocated memory page to the host space and mark each copied memory page on the cache as invalid. Further details with regards to the operations of the thread caching component 113 are described below.

Figure 2:
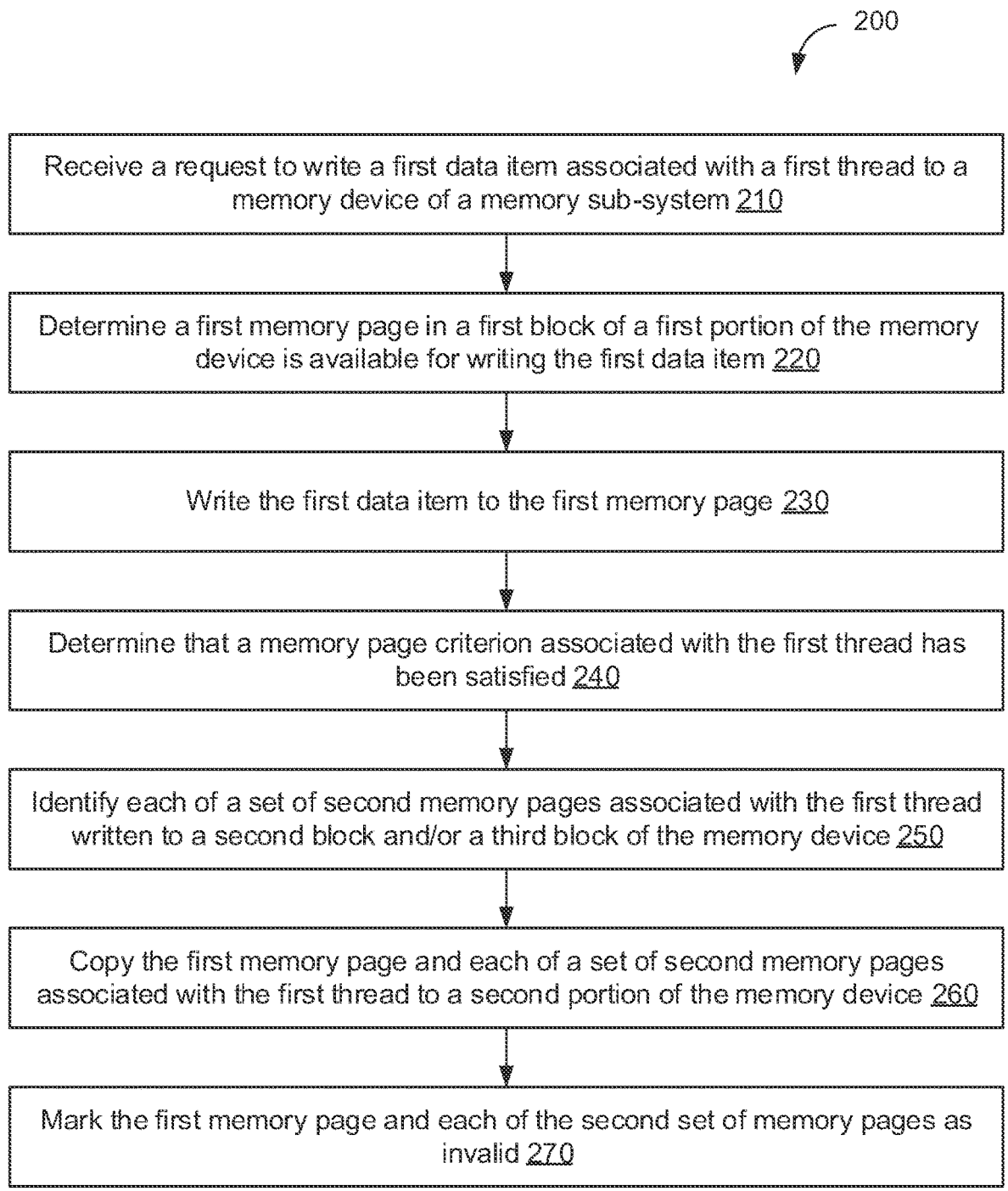
FIG. 2 is a flow diagram of an example method to cache memory pages of parallel independent threads at a memory device, in accordance with some embodiments of the present disclosure.

FIG. 2 is a flow diagram of an example method 200 to cache memory pages for parallel independent threads at a memory device, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the thread caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4A:
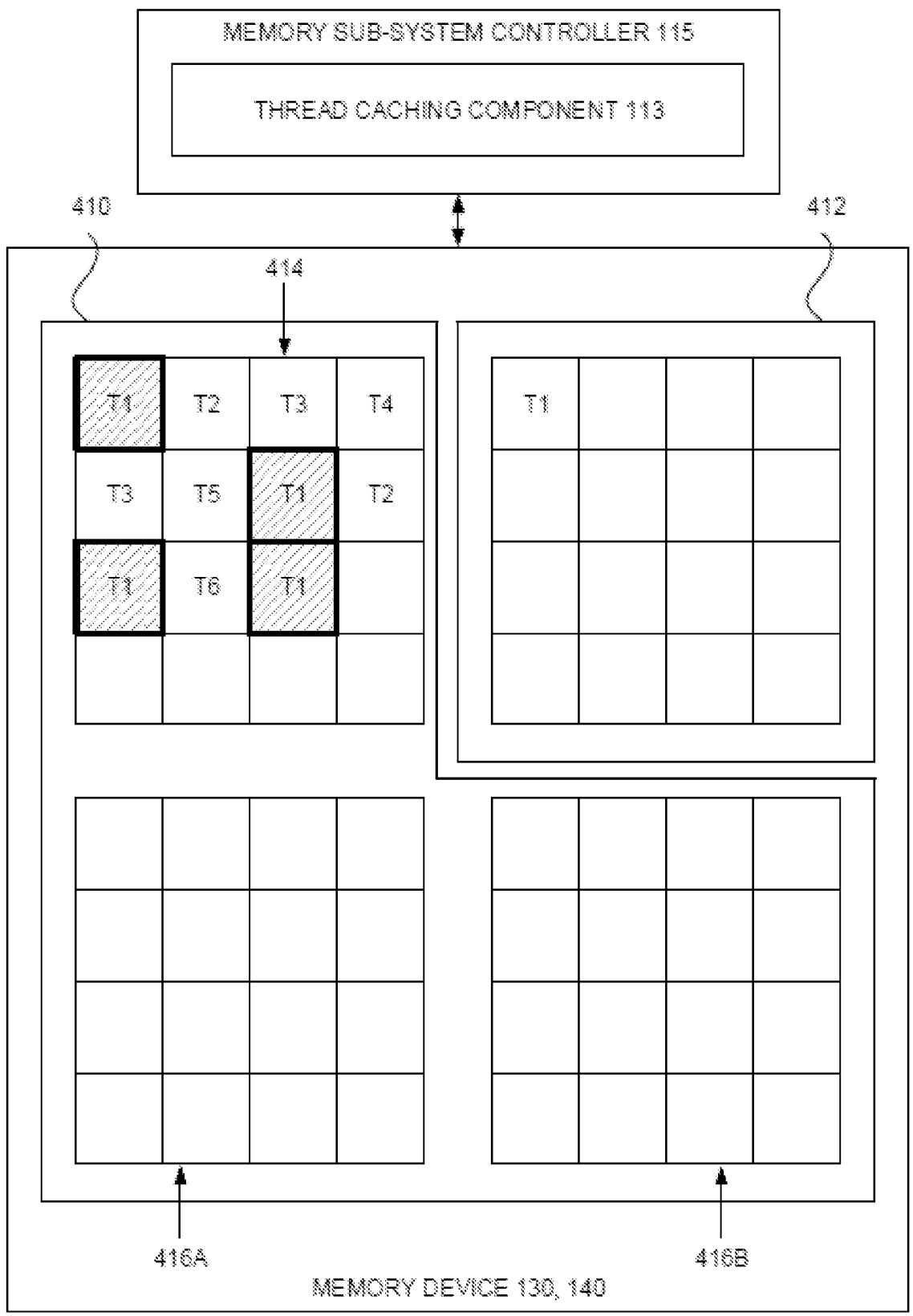
FIGS. 4A-4E illustrate caching parallel independent threads at a memory device, in accordance with some embodiments of the present disclosure.

At operation 210, the processing logic receives a request to write a first data item associated with a first thread to a memory device of a memory sub-system. FIG. 4A illustrates an example memory device used for caching memory pages of parallel independent threads, in accordance with embodiments of the present disclosure. The memory device can be a memory device 130, 140 of memory sub-system 110, described with respect to FIG. 1. In some embodiments, a first section of memory device 130, 140 can include a cache 410 and a second section of memory device 130, 140 can include host space 412 (i.e., designated space at memory device 130, 140 that is directly addressable by the host). Cache 410 can include one or more low density blocks (e.g., SLC blocks) and host space 412 can include one or more high density (e.g., XLC) blocks. During operation of memory sub-system 110, thread caching component 113 can receive data to be stored at memory device 130, 140. Thread caching component 113 can write the received data to a memory page of the cache 410 and subsequently copy the memory page to host space 412 (e.g., in response to determining cache 410 is full).

A first section of cache 410 can include a write block 414. Thread caching component 113 can receive data associated with multiple threads and write the received data to memory pages of write block 414. A second section of cache 410 can include two or more data compaction blocks 416. As illustrated in FIG. 4A, cache 410 can include at least a first data compaction block 416A and a second data compaction block 416B. Each data compaction block 416 can be reserved to store data pages associated with a particular modification frequency. For example, first data compaction block 416A can be a high modification frequency data compaction block and second data compaction lock 416B can be a low modification frequency data compaction block. It should be noted that although embodiments of the present disclosure discuss a first data compaction block 416A and a second data compaction block 416B, memory device 130, 140 can include any number of data compaction blocks 416. Each data compaction block 416 can be associated with a distinct modification frequency, in accordance with embodiments described herein.

Referring back to FIG. 2, at operation 220, in the processing logic can determine that a first memory page in a first block (i.e., write block 414), is available to store the first data item. In some embodiments, thread caching component 113 can determine a memory page of write block 414 is available to store the first data item using a cursor. A cursor can be a pointer to a portion of a block (e.g., a memory page) that is available to store data. Memory sub-system controller 115 can maintain a cursor indicating a particular memory page of a block that is available to store data. In response to thread caching component 113 writing or copying data to the memory page indicated by the cursor, memory sub-system controller 115 can update the cursor to indicate another memory page of the block that is available to store subsequently received data. In an illustrative example, in response to receiving data associated with thread 1, thread caching component 113 can identify an available memory page of write block 414 using a cursor for write block 414. In other or similar embodiments, thread caching component 113 can determine a memory page in write block 414 is available for writing the first data item using other suitable techniques (e.g., a metadata table, etc.).

At operation 230, the processing logic can write the first data item to the first memory page. In response to identifying an available memory page of write block 414, thread caching component 113 can write the data associated with thread 1 to the available memory page (indicated as "T1" in FIG. 4A). Thread caching component 113 can continue to write data associated with particular threads to available memory pages of write block 414 in the order each data item is received. For example, thread caching component 113 can receive consecutive requests to write data associated with thread 2, thread 3, thread, 4, and thread 3 to memory device 130, 140. As illustrated in FIG. 4A, thread caching component 113 can write data associated with thread 2, thread 3, thread 4, and thread 3 to memory pages of write block 414 in the order each data item is received.

Referring back to FIG. 2, at operation 240, the processing logic determines that a memory page criterion associated with the first thread has been satisfied. As described previously, thread caching component 113 can allocate a particular number of memory pages of cache 410 to a particular thread. For example, thread caching component 113 can allocate four memory pages of cache 410 to each thread (e.g., thread 1, thread 2, thread 3, etc.). In some embodiments, thread caching component 113 can determine the memory page criterion associated with the first thread has been satisfied in response to determining each memory page allocated to the first thread stores data in cache 410. As illustrated in FIG. 4A, data associated with thread 1 is stored in four memory pages of write block 414. Therefore, thread caching component 113 can determine the memory page criterion associated with thread 1 has been satisfied.

In response to determining that each memory page allocated to a particular thread is stored in cache 410, thread caching component 113 can copy each allocated memory page to a block of host space 412. As illustrated in FIG. 4A, in response to determining each memory page allocated to thread 1 is stored in write block 414 of cache 410, thread caching component 113 can copy each allocated memory page to host space 412 and mark each copied memory page of write block 414 as invalid.

In some embodiments, thread caching component 113 can mark each copied memory page as invalid via a memory page data structure (e.g., a metadata table) for memory device 130, 140. Each entry of the memory page data structure can be configured to store information associated with a respective memory page of memory device 130, 140. For example, each entry of the memory page data structure can include a logical address for a particular memory page, a physical address of data stored at the particular memory page, a pointer indicating another logical address of another memory page storing data of the memory page, etc. Each entry of the memory page data structure can further include a validity value (e.g., a validity bit) to indicate whether the data stored at a particular memory page is valid or invalid. In accordance with the previous example, in response to copying each memory page associated with thread 1 to host space 412, thread caching component 113 can generate an entry in the memory page data structure associated with an address of host space 412 that stores the copied data. Thread caching component 113 can set a validity value in the generated entry to indicate the data stored at host space 412 is valid (e.g., set the validity bit to 1). Thread caching component 113 can further identify an entry corresponding to each memory page associated with thread 1 of write block 414 and modify a the validity value in each identified entry to indicate the copied data is invalid in write block 414 (e.g., set the validity bit to 0). The memory page data structure can be a logical to physical address table, in some embodiments. Thread caching component 113 can mark each copied memory page as invalid in accordance with other suitable techniques, in other or similar embodiments. As illustrated in FIG. 4A, thread caching component 113 copies the memory pages associated with thread 1 to host space 412 and marks each copied memory page on write block 414 as invalid.

In some embodiments, thread caching component 113 can determine that a memory space criterion associated with write block 414 is satisfied. Thread caching component 113 can determine that a memory space criterion is satisfied in response to determining a threshold number of memory pages of a block store valid or invalid data (i.e., are unavailable). Additionally or alternatively, thread caching component 113 can determine that the memory space criterion is satisfied in response to determining a threshold number of memory pages of a block are available to store data. In some embodiments, thread caching component 113 can maintain a memory space data structure (e.g., a metadata table) to store values indicating a number of unavailable and/or available memory pages for each block of memory device 130, 140. Thread caching component 113 can determine the number of unavailable and/or available memory pages for a particular block by referencing an entry of the memory space data structure associated with the particular block. In an illustrative example, write block 414 can include 16 total memory pages. As illustrated in FIG. 4A, 11 memory pages of write block 414 store valid or invalid data and 5 memory pages are available for writing or copying data. Thread caching component 113 can identify the number of unavailable and/or available memory pages in write block 414 by referencing the memory space data structure. In response to determining the number of unavailable and/or available memory pages satisfies a threshold number of memory pages, thread caching component 113 can determine that the memory space criterion is satisfied. Thread caching component 113 can determine the number of unavailable and/or available memory pages of write block 414 in accordance with other suitable techniques, in other or similar embodiments.

In response to determining the memory space criterion is satisfied, thread caching component 113 can determine whether data compaction block 416A has enough space to store each valid memory page of write block 414. In some embodiments, thread caching component 113 can determine whether data compaction block 416A has enough space to store each valid memory page of write block 414 by referencing an entry for data compaction block 416A of the metadata data structure, in accordance with previously described embodiments. In response to determining data compaction block 416A has enough space to store each valid memory page of write block 414, thread caching component 113 can copy each valid memory page of write block 414 to data compaction block 416A. Thread caching component 113 can identify each valid memory page of write block 414 via the memory page data structure, in accordance with previously described embodiments.

Figure 4B:
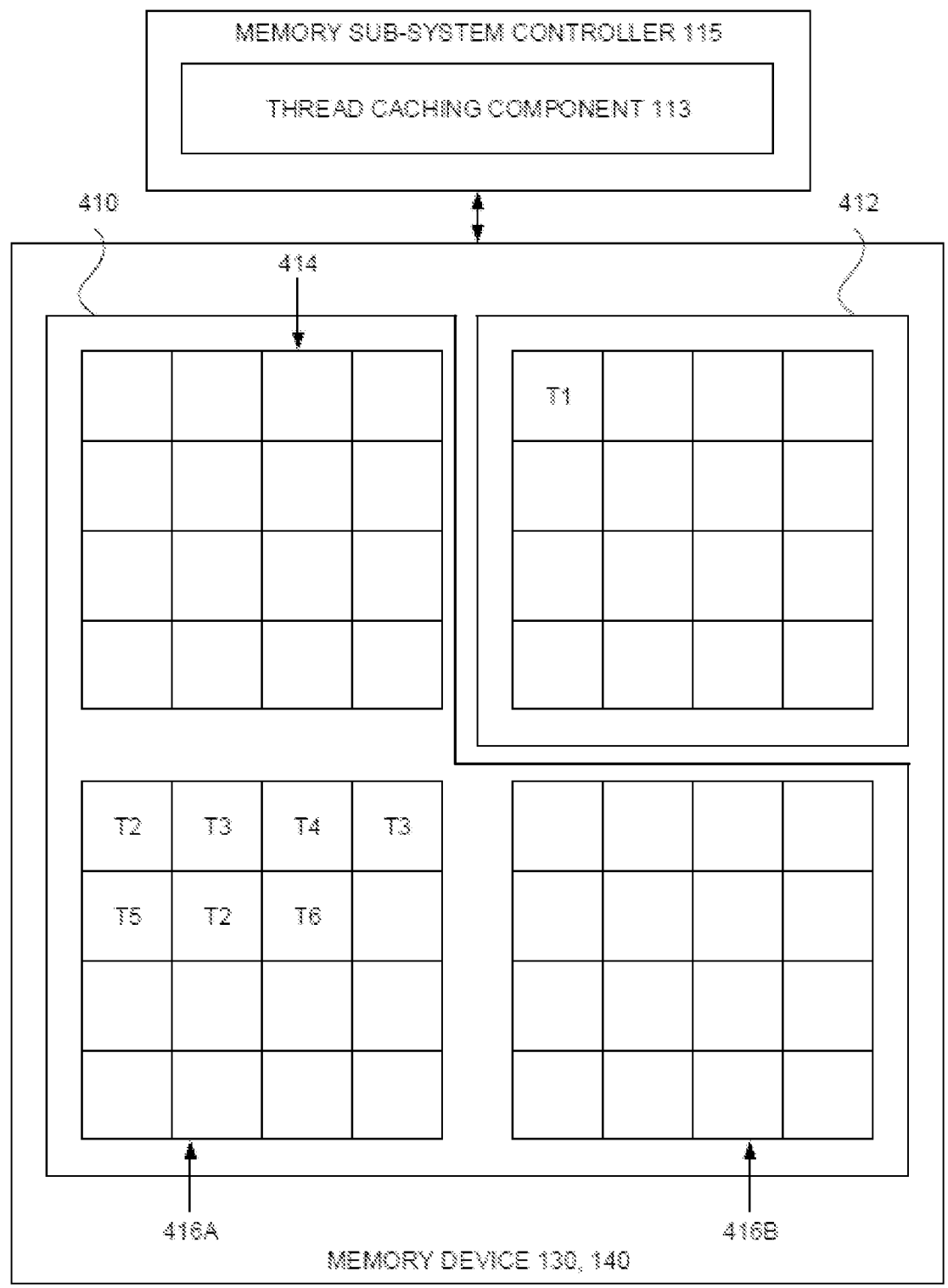

In response to copying each valid memory page of write block 414 to data compaction block 416A, thread caching component 113 can erase write block 414. As illustrated in FIG. 4B, thread caching component 113 copies each valid memory page of write block 414 to data compaction block 416A and erases write block 414.

Figure 4C:
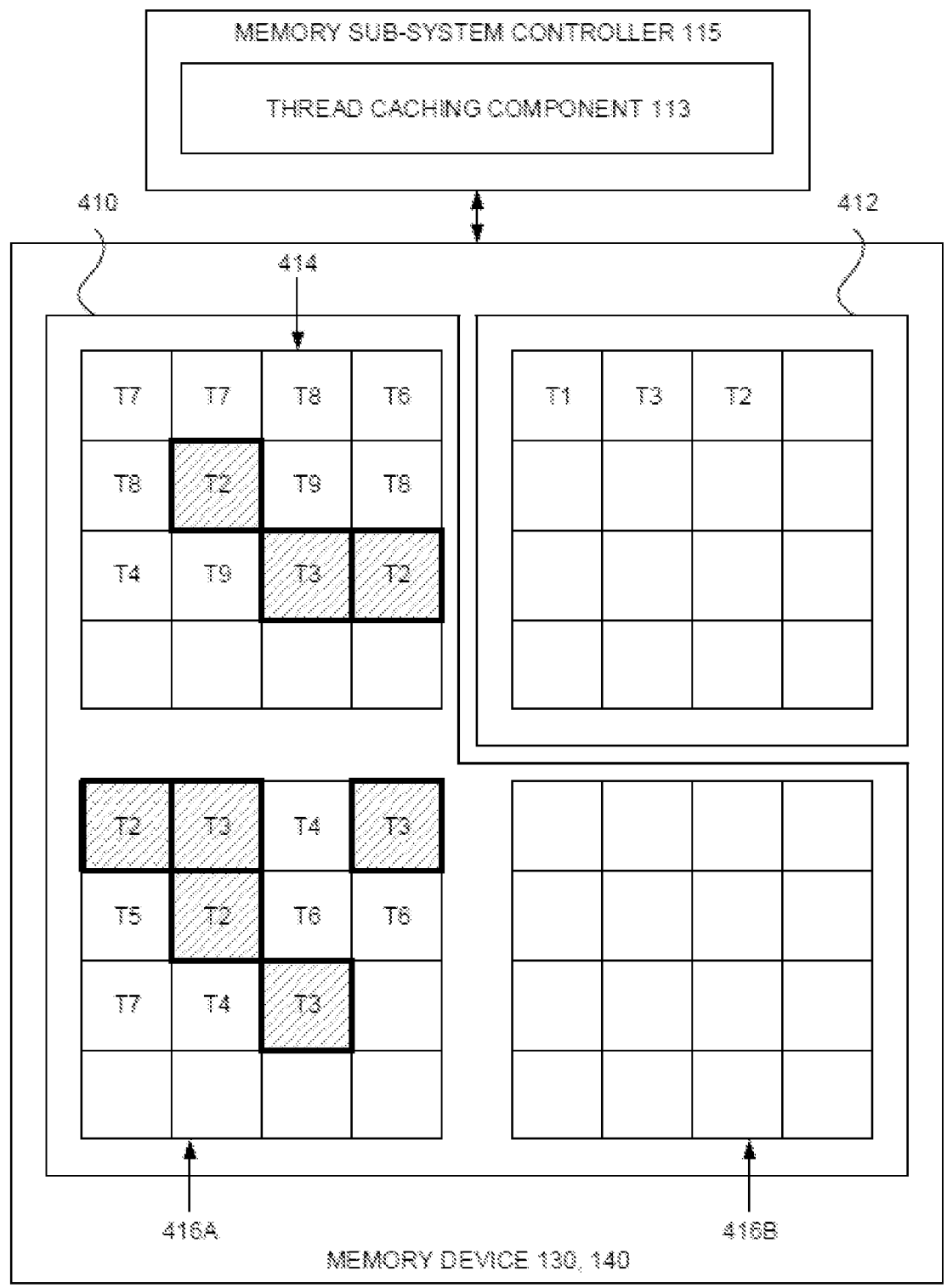

Thread caching component 113 can continue to receive data to be written to memory device 130, 140 (e.g., from host system 120) and write each received memory page to a memory page of write block 414 in the order the data is received. As illustrated in FIG. 4C, thread caching component can receive consecutive data items associated with thread 7, thread 8, thread 6, thread 8, etc. Thread caching component 113 can write the received data items to write block 414 in the order received. In response to determining a memory space criterion associated with write block 414 is satisfied, thread caching component 113 can copy each valid memory page from write block 414 to data compaction block 416A (i.e., a high modification frequency data compaction block), in accordance with previously described embodiments.

In some embodiments, thread caching component 113 can determine that a memory page criterion associated with a particular thread is satisfied, in accordance with previously described embodiments. For example, thread caching component 113 can determine a memory page criterion associated with thread 3 is satisfied in response to determining a threshold number of memory pages allocated to thread 3 are stored at cache 410 (e.g., at write block 414 and data compaction block 416A). Referring back to FIG. 2, At operation 250, the processing logic identifies each of a set of second memory pages associated with the first thread written to a second block and/or a third block of the memory device. In response to determining the threshold number of memory pages allocated to thread 3 are stored at cache 410, thread caching component 113 can identify each of the set of memory pages associated with thread 3.

At operation 260, the processing logic can copy the first memory page and each of the set of second memory pages associated with the first thread to a second portion of the memory device. In some embodiments, the first memory page can refer to a memory page associated with thread 3 that is stored at write block 414 and each of the set of second memory pages can refer to each memory page associated with thread 3 that is stored at first data compaction block 416A. In response to identifying each memory page allocated to thread 3, thread caching component 113 can copy each allocated memory page to host space 412. At operation 270, the processing logic can mark the first memory page at write block 414 and each of the second set of memory pages at data compaction block 416A as invalid. Thread caching component 113 can mark each copied memory page as invalid in a memory page data structure, in accordance with previously described embodiments.

In some embodiments, thread caching component 113 can determine that a memory space criterion associated with data compaction block 416A is satisfied. In such embodiments, thread caching component 113 can copy each valid memory page of data compaction block 416A to data compaction block 416B (i.e., a low modification frequency data compaction block). Further details regarding copying valid memory pages from data compaction block 416A to data compaction block 416B are provided with respect to FIG. 3.

Figure 3:
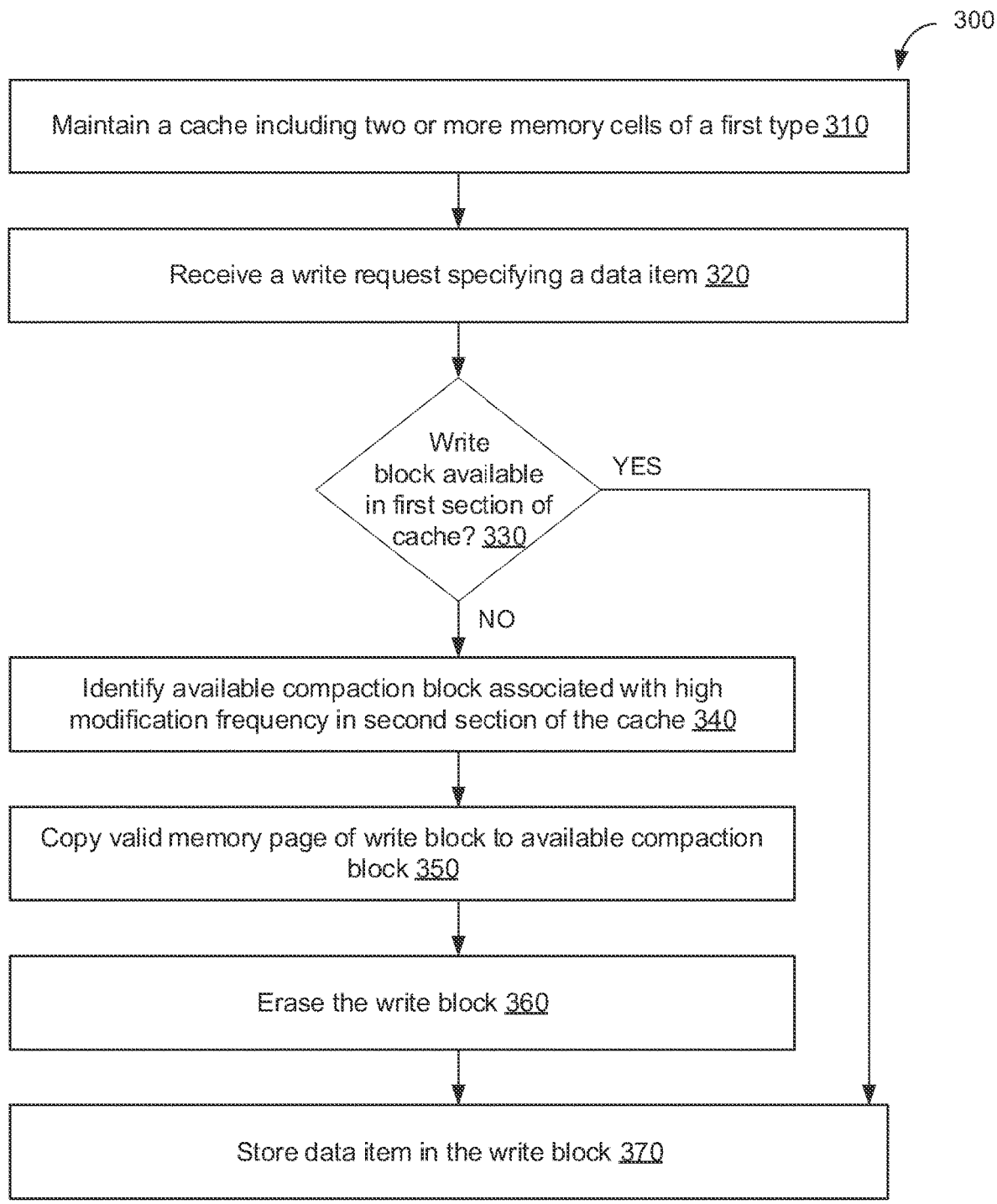
FIG. 3 is a flow diagram of another example method to cache memory pages of parallel independent threads at a memory device, in accordance with some embodiments of the present disclosure.

FIG. 3 is a flow diagram of another example method to cache parallel independent threads at a memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the thread caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic maintains a cache including two or memory cells of a first type. The cache can be cache 410 of FIGS. 4A-4E, in accordance with previously described embodiments. As described previously, a first section of memory device 130, 140 can include a cache 410 and a second section of memory device 130, 140 can include host space 412. Cache 410 can include one or more low density blocks including memory cells of a first type (e.g., SLC blocks). Host space 412 can include one or more high density blocks including memory cells of a second type (e.g., XLC blocks). Cache 410 can include at least a write block 414, a high modification frequency data compaction block 416A and a low modification frequency data compaction block 416B, in accordance with previously described embodiments.

At operation 320, the processing logic receives a write request specifying a data item. As described previously, the data item of the write request can be associated with a particular thread. At operation 330, the processing logic determines whether a write block (e.g., write block 414) is available in a first section of the cache. Thread caching component 113 can determine whether write block 414 is available via a memory space data structure, in accordance with previously described embodiments. In response to the processing logic determining write block 414 is available to store the data item, method 300 continues to operation 370. In response to determining write block 414 is not available to store the data item, method 300 continues to operation 340.

At operation 340, the processing logic identifies an available compaction block associated with a high modification frequency in a second section of the cache. As described previously, the compaction block associated with a high modification frequency can refer to data compaction block 416A. Thread caching component 113 can determine whether data compaction block 416A is available to store memory pages of write block 414 via the memory space data structure, in accordance with previously described embodiments. In response to thread caching component 113 determining data compaction block 416A is available to store memory pages of write block 414, method 300 can continue to operation 350, described below.

Figure 4D:
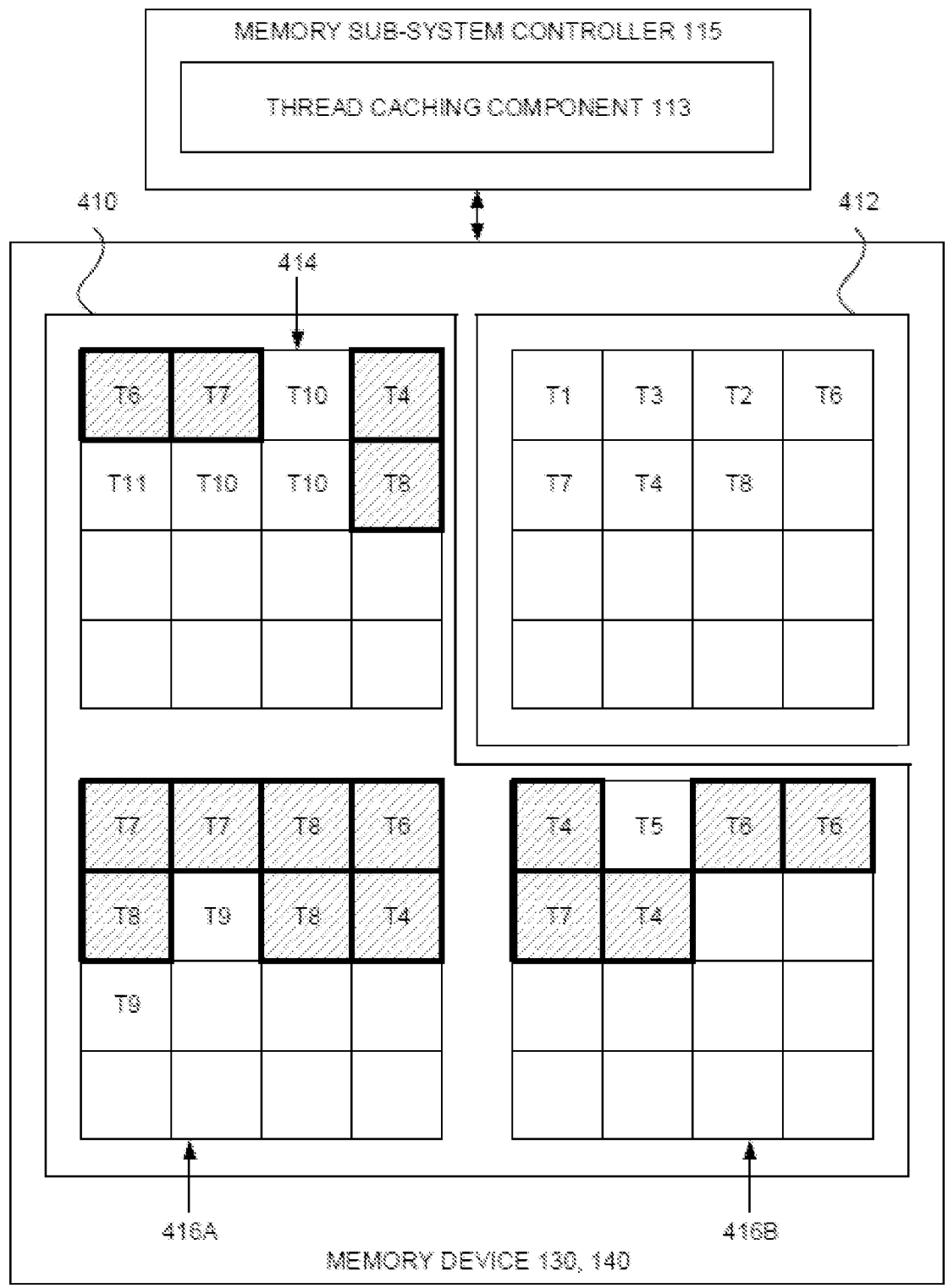

In response to determining data compaction block 416A is not available to store memory pages of write block 414, thread caching component 113 can identify an available compaction block associated with a low modification frequency in the second section of cache 410. For example, thread caching component 113 can determine data compaction block 416B is available, in accordance with previously described embodiments. In response to determining data compaction block 416B is available, thread caching component 113 can copy each valid memory page of data compaction block 416A to data compaction block 416B. As illustrated in FIG. 4D, thread caching component 113 can copy valid memory pages associated with thread 4, thread 5, thread 6, thread 6, thread 7, and thread 4 from data compaction block 416A to data compaction block 416B. In response to copying the valid memory pages to data compaction block 416B, thread caching component 113 can erase data compaction block 416A. Memory pages can be copied from write block 414 to data compaction block 416A, in accordance with previously described embodiments.

Although embodiments of the present disclosure describe thread caching component 113 copying memory pages from data compaction block 416A to data compaction block 416B in response to receiving a request to write data to cache 410, thread caching component 113 can copy memory pages from data compaction block 416A to data compaction block 416B in other instances. For example, thread caching component 113 can determine a memory space criterion associated with data compaction block 416A is satisfied by determining a threshold number of memory pages of data compaction block 416A are unavailable. Thread caching component 113 can copy each memory page of data compaction block 416A to data compaction block 416B and erase data compaction block 416A, in response to this determination.

Referring back to FIG. 3, at operation 350, in response to determining a compaction block associated with a high modification frequency (i.e., data compaction block 416A) is available, the processing logic copies a valid memory page of the write block 414 to the available compaction block. At operation 360, the processing logic (i.e., thread caching component 113) erases the write block 114, in accordance with previously described embodiments. At operation 370, the processing logic stores the data item specified in the write request in the write block.

As described previously with respect to FIG. 2, thread caching component 113 can copy each memory page from cache 410 to host space 412 in response to determining a memory page criterion associated with a particular thread has been satisfied. In an illustrative example, as seen in FIG. 4D, memory pages associated with thread 6 (labelled as "T6") can be stored at write block 414, data compaction block 416A, and data compaction block 416B, in accordance with previously described embodiments. In response to determining each memory page allocated to thread 6 is stored at cache 410, thread caching component 113 can copy each allocated memory page from write block 414, data compaction block 416A, and data compaction block 416B to host space 412. Thread caching component 113 can mark each allocated memory page copied to host space 412 as invalid, in accordance with previously described embodiments.

Figure 4E:
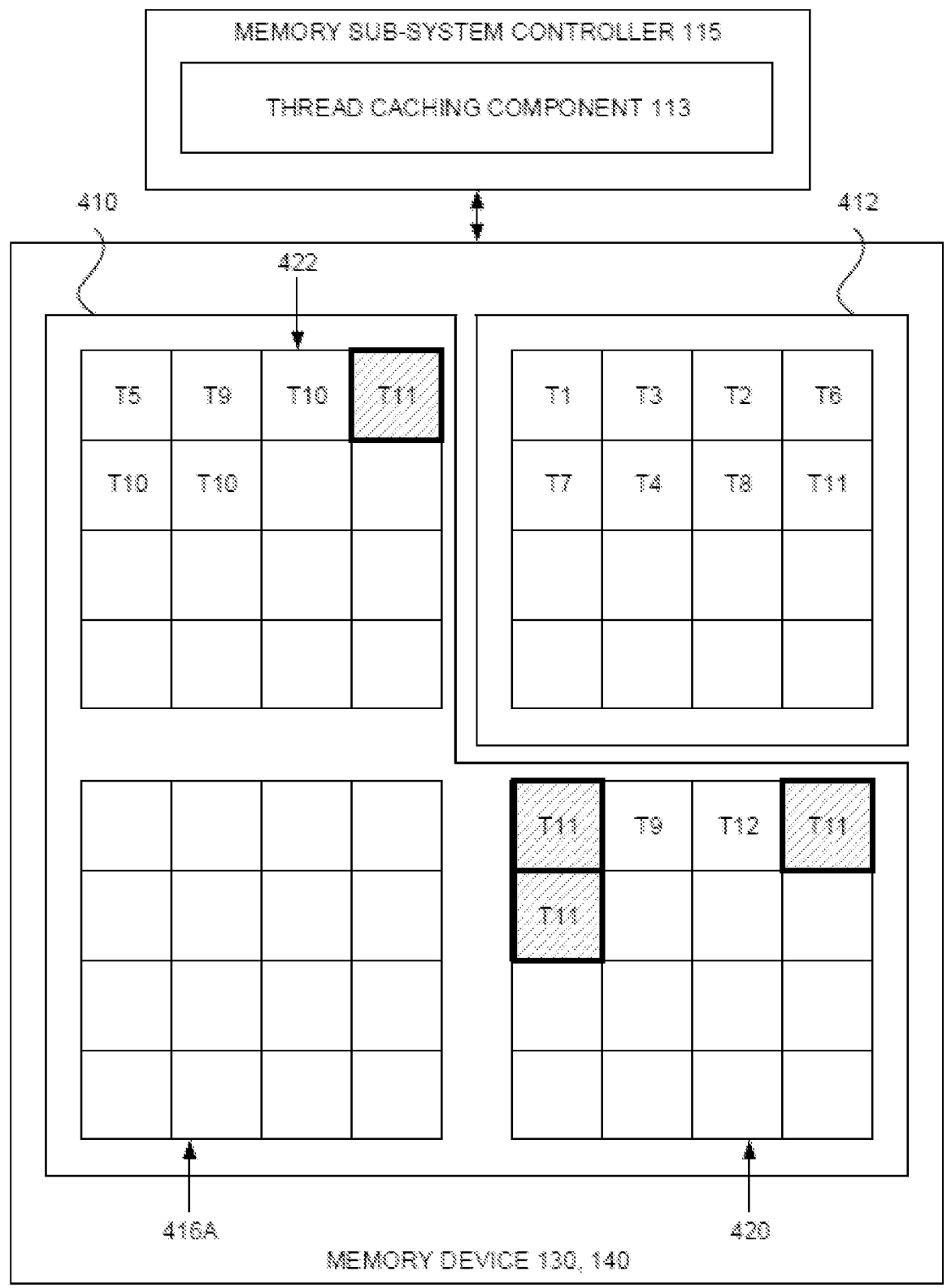

In some embodiments, thread caching component 113 can determine that a memory space criterion associated with data compaction block 416B is satisfied (e.g., an number of unavailable and/or available memory pages of data compaction block 416B satisfies a threshold number of memory pages). In such embodiments, thread caching component 113 can copy each valid memory page from write block 414 to data compaction block 416A and erase write block 414. Thread caching component 113 can copy each valid memory page from data compaction block 416B to write block 414 and erase data compaction block 416B. As illustrated in FIG. 4E, thread caching component 113 can designate the second data compaction block 416B as a new write block 420 and designate write block 414 as a new data compaction block 422 associated with a low modification frequency. In some embodiments, thread caching component 113 can designate the write block as the new data compaction block 422 prior to erasing data compaction block 416B. Thread caching component 113 can receive data items associated with multiple threads to be stored a memory device 130, 140 in accordance with previously described embodiments. In response to receiving the data items associated with the multiple threads, thread caching component 113 can write the data to memory pages of new write block 420 in the order each data item is received.

Figure 5:
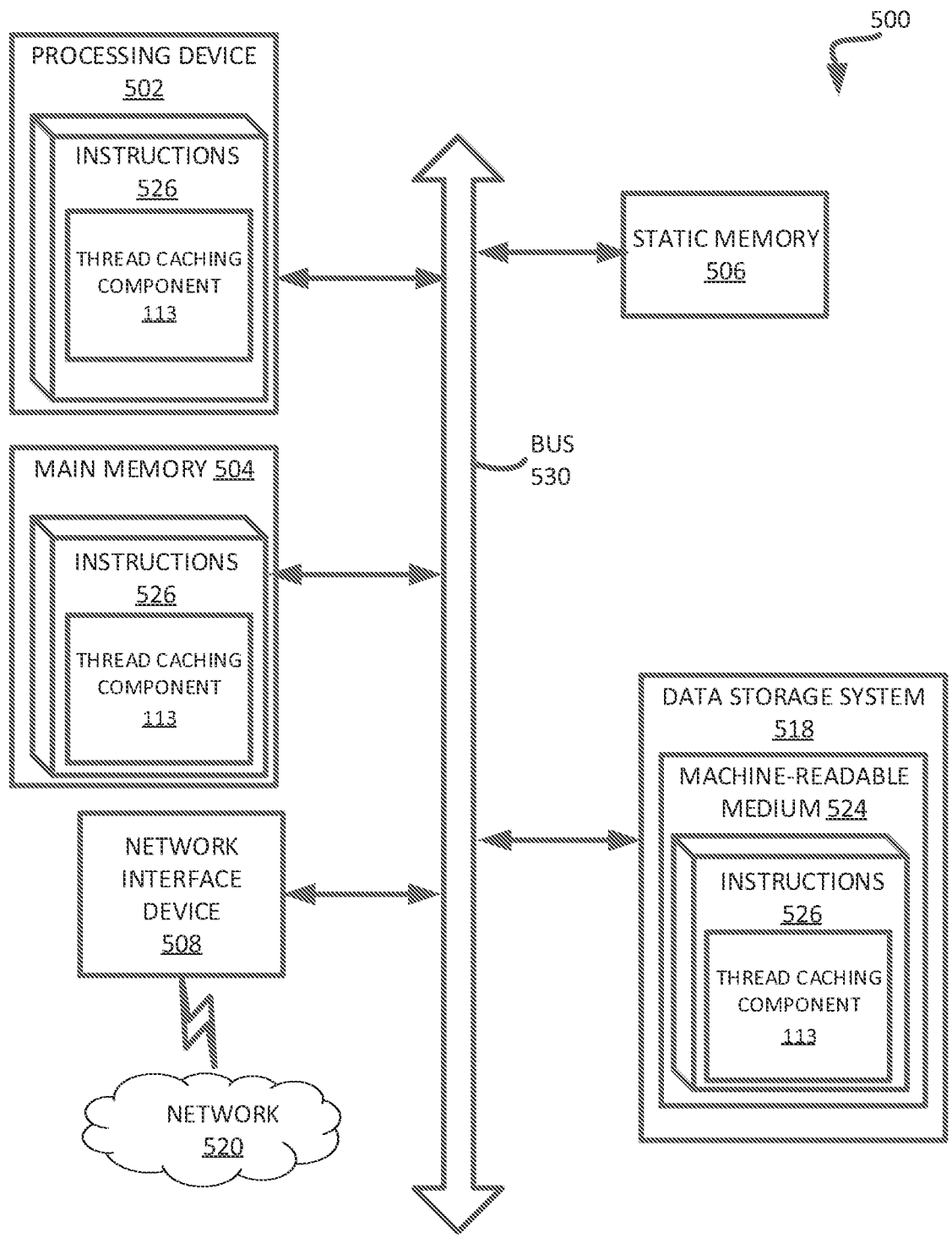
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to thread caching component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a thread caching component (e.g., the thread caching component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
programing data items to memory pages of a cache that resides in a first portion of a memory device, wherein each of the data items programmed to the memory pages are associated with at least one of a plurality of processing threads of a host system;
responsive to determining that a threshold number of memory pages, associated with a first processing thread, are programmed in the cache, identifying, in a first block of the cache, at least one first memory page including a first data associated with the first processing thread and, in a second block of the cache, at least one second memory page including a second data item associated with the first processing thread;
copying the first data item and the second data item to a second portion of the memory device while retaining, in each of the first block and the second block, other data items of other processing threads, wherein the second portion of the memory device is provisioned as host space that is addressable by the host system; and
designating the first memory page and the at least one second memory page as invalid.

2. The method of claim 1, wherein the first block of the cache is a write block and the second block is a data compaction block associated with a first modification frequency.

3. The method of claim 1, further comprising:
responsive to determining that the first block does not include a memory page that is available for writing the first data item, copying data of each valid memory page of the first block to one or more memory pages of the second block; and
erasing the first block.

4. The method of claim 3, further comprising:
responsive to determining that the second block does not have the one or more memory pages available for copying data the first block, copying data of each valid memory page of the second block to one or more memory pages of a third block of the cache,
wherein each memory page of the first block is copied to the one or more memory pages of the second block in response to erasing the second block.

5. The method of claim 4, wherein the third block is an additional data compaction block associated with a second modification frequency.

6. The method of claim 1, wherein a first plurality of memory cells residing at the first portion of the memory device are configured to store a first number of bits and a second plurality of memory cells residing at the first portion of the memory device are configured to store a second number of bits, and wherein the first number of bits is less than the first number of bits.

7. The method of claim 1, wherein designating the first memory page and the at least one second memory page as invalid comprises:
identifying, in a metadata table, an entry corresponding with the first memory page; and
setting a value of the identified entry to indicate that the first memory page at the first block is invalid.

8. A system comprising:
a memory device; and
a processing device, operatively coupled to the memory device, the processing device to perform operations comprising:
programming data items to memory pages of a cache that resides in a first portion of a memory device, wherein each of the data items programmed to the memory pages are associated with at least one of a plurality of processing threads of a host system;
responsive to determining that a threshold number of memory pages, associated with a first processing thread, are programmed in the cache, identifying, in a first block of the cache, at least one first memory page including a first data item associated with the first processing thread and, in a second block of the cache, at least one second memory page including a second data item associated with the first processing thread;
copying the first data item and the second data item to a second portion of the memory device while retaining, in each of the first block and the second block, other data items of other processing threads, wherein the second portion of the memory device is provisioned as host space that is addressable by the host system; and
designating the first memory page and the at least one second memory page as invalid.

9. The system of claim 8, wherein the first block of the cache is a write block and the second block is a data compaction block associated with a first modification frequency.

10. The system of claim 8, wherein the operations further comprise:
responsive to determining that the first block does not include a memory page that is available for writing the first data item, copying data of each valid memory page of the first block to one or more memory pages of the second block; and
erasing the first block.

11. The system of claim 10, wherein the operations further comprise:
responsive to determining that the second block does not have the one or more memory pages available for copying data of the first block, copying data of each valid memory page of the second block to one or more memory pages of a third block of the cache,
wherein each memory page of the first block is copied to the one or more memory pages of the second block in response to erasing the second block.

12. The system of claim 11, wherein the third block is an additional data compaction block associated with a second modification frequency.

13. A non-transitory computer-readable storage medium comprising instructions that, when executed by a processing device, cause the processing device to perform operations comprising:
programming data items to memory pages of a cache that resides in a first portion of a memory device, wherein each of the data items programmed to the memory pages are associated with at least one of a plurality of processing threads of a host system;
responsive to determining that a threshold number of memory pages, associated with a first processing thread, are programmed in the cache, identifying, in a first block of the cache, at least one first memory page including a first data item associated with a first processing thread and, in a second block of the cache, at least one second memory page including a second data item associated with the first processing thread;
copying the first data item and the second data item to a second portion of the memory device while retaining, in each of the first block and the second block, other data items of other processing threads, wherein the second portion of the memory device is provisioned as host space that is addressable by the host system; and
designating the first memory page and the at least one second memory page as invalid.

14. The non-transitory computer-readable storage medium of claim 13, wherein the first block of the cache is a write block and the second block is a data compaction block associated with a first modification frequency.

15. The non-transitory computer-readable storage medium of claim 13, wherein the operations further comprise:
responsive to determining that the first block does not include a memory page that is available for writing the first data item, copying data of each valid memory page of the first block to one or more memory pages of the second block; and
erasing the first block.

16. The non-transitory computer-readable storage medium of claim 15, wherein the operations further comprise:

responsive to determining that the second block does not have the one or more memory pages available for copying data of the first block, copying data of each valid memory page of the second block to one or more memory pages of a third block of the cache, wherein each memory page of the first block is copied to the one or more memory pages of the second block in response to erasing the second block.

17. The non-transitory computer-readable storage medium of claim 16, wherein the third block is an additional data compaction block associated with a second modification frequency.

* * * * *